Sept. 14, 1943.  E. E. LYNCH ET AL  2,329,548
METHOD OF MANUFACTURING MATCHED SPIRALS
Filed June 18, 1941

Inventors:
Edward E. Lynch,
Herbert C. Thomas,
by Harry E. Dunham
Their Attorney.

Patented Sept. 14, 1943

2,329,548

UNITED STATES PATENT OFFICE 2,329,548

METHOD OF MANUFACTURING MATCHED SPIRALS

Edward E. Lynch, Easthampton, Mass., and Herbert C. Thomas, Montgomery, Ala., assignors to General Electric Company, a corporation of New York Application June 18, 1941, Serial No. 398,616

4 Claims. (Cl. 148—4)

Our invention relates to a method of making matched bi-metal temperature responsive spring elements. For example, in a thermal wattmeter the measurement is produced by the opposed torque of two bi-metal spirals, one of which is heated in proportion to the sum of the current and voltage of the metered circuit and the other of which is heated in proportion to the difference of the current and voltage of the metered circuit. Unless the spirals have similar characteristics the measurement is likely to be erroneous and the extent and direction of error unpredictable. For example, the spirals should have similar spring characteristics, similar temperature torque characteristics, similar heat storage capacity, similar temperature-time heating and cooling characteristics, etc. Proper matching of such spirals requires close control over the materials used in the spirals, their dimensions, set, heat-treatment and the like. Again, it may be desirable to provide spirals which are matched except as to one feature such as length or resistance in order that such feature may be varied in a known manner for the purpose of introducing predictable and controllable compensation for some reason.

Our method of manufacturing spirals contemplates the matching of all or a part of the important characteristics and close control of the characteristics which are intentionally made different.

Our method will be explained in connection with the making of matched spirals for thermal wattmeters which method we have employed with excellent results.

Figure 1:
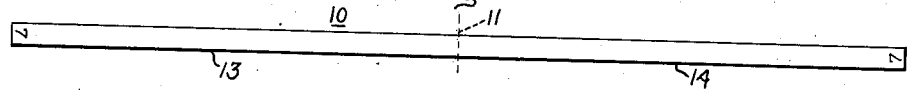
Figure 2:
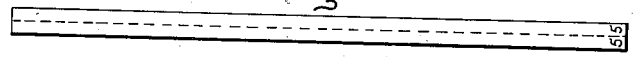
Figure 3:
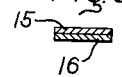
Figure 4:
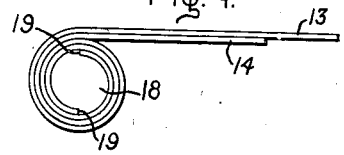
Figure 5:
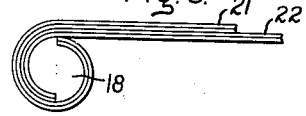
Figure 6:
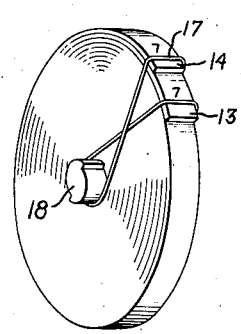
Figure 7:
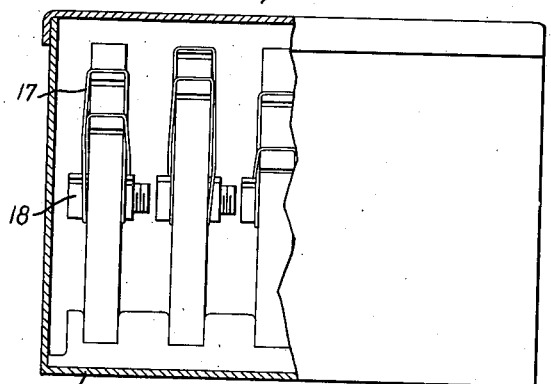
Figure 8:
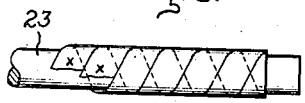

The features of our invention which are believed to be novel and patentable will be pointed out in the claims appended hereto. For a better understanding of our invention reference is made in the following description to the accompanying drawing in which Figs. 1 and 2 represent strips of bi-metal material from which matched spirals may be made. Fig. 3 is a cross-sectional representation of such bi-metal material. Fig. 4 represents the step of winding a pair of spirals which are to be matched. Fig. 5 represents a winding step where four spirals are wound simultaneously. Fig. 6 shows a set of spirals after being wound with their ends secured. Fig. 7 represents sets of spirals in a furnace receptacle ready for a heat treatment and Fig. 8 represents a pair of elements of the helix form during the process of manufacture to obtain matched characteristics.

Bi-metal material for use in thermal responsive spirals is generally composed of a ribbon-like strip made up of two metals or alloys of metal which have different temperature coefficients of expansion. The two materials which have the different thermal expansion coefficients are first made in ingot form and then intimately secured together by welding or brazing so as to make a composite ingot of metal with the different metals or alloys on opposite sides. The composite ingot may then be rolled to a desired thickness and cut into strips of suitable dimensions for use. A strip of the bi-metal material can then be wound in a spiral and heat-treated to give it a spiral spring set and to produce a temperature responsive device which tends to uncoil and recoil to a limited extent in response to changes in temperature. If the material having the greater temperature coefficient is on the inside of the spiral convolutions, which is preferably the case, the spiral will uncoil upon an increase in temperature.

Where it is desirable to provide two spirals having exactly similar characteristics, considerable difficulty has heretofore been experienced in properly matching the spirals. Tests for that purpose are tedious and expensive. A great many features enter into the selection and treatment of the materials and the manufacturing process which may change the final results. Strips exactly similar in exterior dimensions cut from different parts of the same sheet of bi-metal may have different characteristics because of slight differences in the texture or alloy composition, or individual dimensions of the two materials making up the strips. For this reason we have found it desirable as one of the steps of our method to select material for matched spirals not only from the same sheet but also as far as possible from adjacent or contiguous sections of the sheet. In Fig. 1 we have represented a continuous strip of bi-metal 10 assumed to have the cross-section desired for the final spiral. The strip is made long enough to make at least two spirals. The ends are given any suitable identification mark such as the numeral 7, as shown. The strip is then cut at or near its center 11 and constitutes the bi-metal strips 13 and 14 for the two matched spirals. As an alternative procedure we may take a strip of bi-metal such as shown in Fig. 2 and cut it into lengthwise pieces along the dotted line, identify each piece as by the numerals 5, machine the pieces to the same width if that is necessary and use them for preparing matched spirals. In this way we are reasonably assured of obtaining two strips which have similar characteristics, are of the same external cross-section and are similar in dimensions as regards the individual metallic parts. Fig. 3 represents a cross-section of a strip of bi-metal having the different metal sections 15 and 16. The thickness of these sections is usually the same in the two strips which are to be used for matched spirals.

Having thus obtained similar strips, we next proceed to wind the two spirals therefrom simultaneously on the same form 18, one over the other, as indicated in Fig. 4 or Fig. 5 with similar sides outermost. The form 18 may have a cam-shaped outer surface having opposite steps 19 in this instance equal to the thickness of the two strips 13 and 14. The inner ends of the strips are secured abutting against the steps 19 of the cam in any suitable way and the strips are then wound in spirals tightly about the form 18. One strip serves as a spacer for the other strip. When completely wound, the outer ends of the strips are secured as by a binding wire 17. See Fig. 6. The spirals are then heat-treated to give them a set or permanent spiral form. Several sets of spirals as thus arranged may be packed in a suitable holder 20 for inserting into a furnace where they are subjected to a heat treatment of sufficient duration and temperature to obtain uniform heating throughout each spiral pack. The heat treatment will depend somewhat on the materials used in the spirals.

A bi-metal material which may be purchased under the trade name "Truflex B" has the following chemical composition. The high expansible side contains 22% nickel, 3% chromium and 75% iron. The low expansible side contains 36% nickel and 64% iron. A satisfactory heat treatment for this particular material is as follows. The wound spirals as shown in Figs. 6 and 7 are placed in a tempering lavite salt bath and maintained at a temperature of 375° C., ±10° C. for not less than one or more than two hours. A lavite salt is a salt which melts at a certain desired temperature to form a molten bath. The packs are then removed from the salt bath and quenched in water to remove salt remnant while it is still in liquid form. Following this, the spiral packs are placed in alcohol and held at −40° C., ±10° C. for a minimum of fifteen minutes. Then the packs are placed in an oil bath such as Texaco White Oil A, and held at 100° C., ±10° C. for a minimum of fifteen minutes. Preferably this alcohol and oil bath heat treatment cycle is repeated.

After such treatment the spiral packs are allowed to cool. When cool the binding wire or the like is removed, the form 18 removed and the two spirals separated by pressing one out of the other edgewise, care being taken to avoid abnormal stresses or deformation likely to cause a permanent change in shape or form. The spirals now have a permanent set. They are similarly spring tempered and are as near as possible of the same shape, size and convolution spacing. The identifying marks on their outer ends show which pair of spirals of a group have been matched.

If less closely formed spirals are desired, spacer strips of equal thickness may be wound between the spiral strips as shown in Fig. 5. In fact spacer strips 21 and 22 of Fig. 5 may be two spirals of another matched pair. We have found that if strips of the same length are formed into spirals as described, the resulting spirals are very nearly perfectly matched as regards all characteristics required of thermal responsive measuring elements. Also, the two matched spirals have equal electrical resistances which is important where the spirals themselves comprise the resistance heater elements. Where necessary two spirals may be made of exactly the same diameter by cutting off the inner end of the smaller spiral and the outer end of the larger spiral.

It is now a simple matter to modify certain characteristics of the spirals in a predictable way without disturbing others where that becomes desirable for compensation or other purposes, by the simple expedient of shortening one spiral, or the same result may be obtained if strips of unequal length, but otherwise matched and processed as herein described, are used to begin with.

The invention is applicable to temperature responsive material made up of more than two lamina and to forms of springs other than spirals as for example helix forms, see Fig. 8, where $x$ and $x$ represent two helix elements as wound on a mandrel form 23 preparatory to a heat-treatment so as to obtain matched characteristics. Here the convolutions of one helix lie between and space the convolutions of the other helix.

What we claim as new and desire to secure by Letters Patent of the United States is:

1. The method of making matched temperature responsive spring elements each made up of layers of materials having different temperature coefficients of expansion which consists in taking strips of similar cross-section from contiguous sections of the same sheet having such layers, forming said strips into the desired shape by simultaneously winding said strips together into similar convolutions with the convolutions of one strip, between the convolutions of the other strip and with similar layers of the strips in the same relative positions in the convolutions, securing said strips together in such convolute forms, simultaneously and similarly heat-treating the strips while thus secured to give them a permanent set in convolute form and then separating the strips while in substantially the set form so as to avoid any permanent deformation from such form.

2. The method of making matched bi-metal temperature responsive spring elements which consists of taking strips of similar cross-section from contiguous sections of the same sheet of temperature responsive bi-metal material, forming said strips into the desired spring shape by simultaneously wrapping both strips on a form with the convolutions of one strip acting as a spacer between the convolutions of the other strip and with similar sides of both strips outwardly, securing the strips in such wrapped-together relation and while so secured uniformly heat-treating the strips to give them a permanent set and then separating the strips while in substantially the set form so as to avoid any permanent change in shape.

3. The method of making matched bi-metal temperature responsive spiral springs, which consists in taking strips of the same cross-section from contiguous sections of the same sheet of bi-metal, winding said strips one over the other into spirals such that the convolutions of one spiral lie between and space the convolutions of the other spiral with similar sides of both strips outermost, securing the strips together in the spiral form to form a pack, uniformly heat-treating such pack to give the spirals a permanent set, and then separating said spirals by edgewise displacement without appreciable deformation.

4. The method of making matched multiple layer temperature responsive springs of convolute form which consists in taking strips of the same cross-section from contiguous sections of the same sheet of suitable multiple layer material, forming said strips into similar convolute form by simultaneously winding the same together into the desired shape with the convolutions of one strip separating the convolutions of another strip and with the same side of all strips in the same relative positions in the different convolutions, securing said strips together in convolute form to form a pack, treating said pack to set the strips in permanent convolute form by heating in a tempering lavite salt bath at about 375 degrees C. between one and two hours, quenching in water, cooling in alcohol at about —40 degrees C. for at least fifteen minutes, and heating in oil at about 100 degrees C. for not less than fifteen minutes, then separating the convolute strips without permanent deformation from the desired convolute form.

EDWARD E. LYNCH.
HERBERT C. THOMAS.